(No Model.) 2 Sheets—Sheet 2.
E. F. G. H. FAURE & J. MacHAFFIE.
SEARCH LIGHT.
No. 539,862. Patented May 28, 1895.
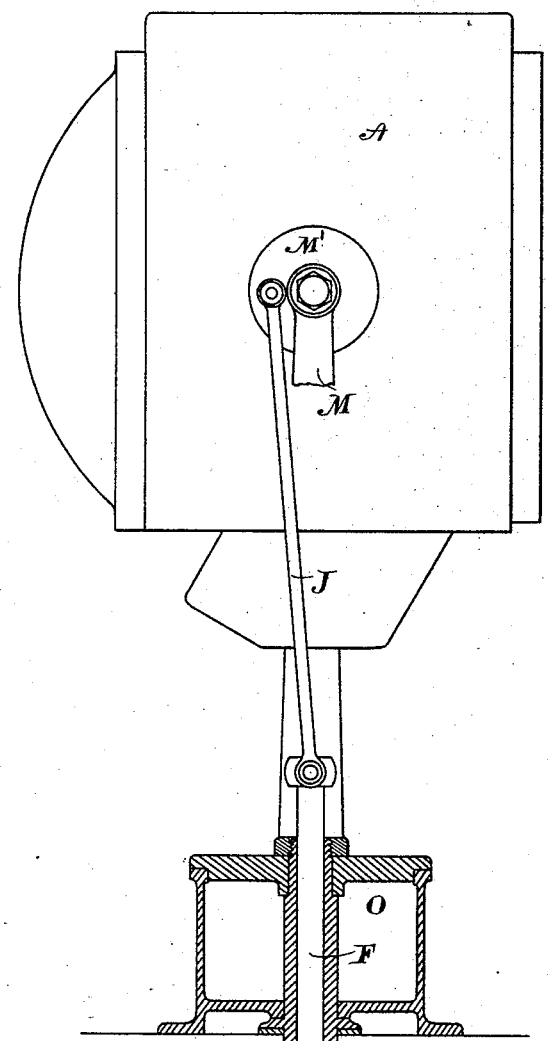
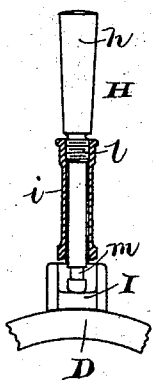
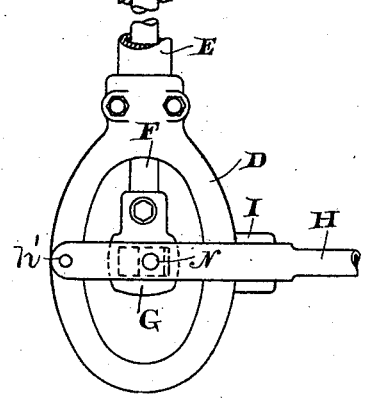
WITNESSES
A. F. Macdonald
J. J. Johnston
INVENTORS
Elie F. G. H. Faure and
John MacHaffie
by
Geo. R. Blodgett
Atty.

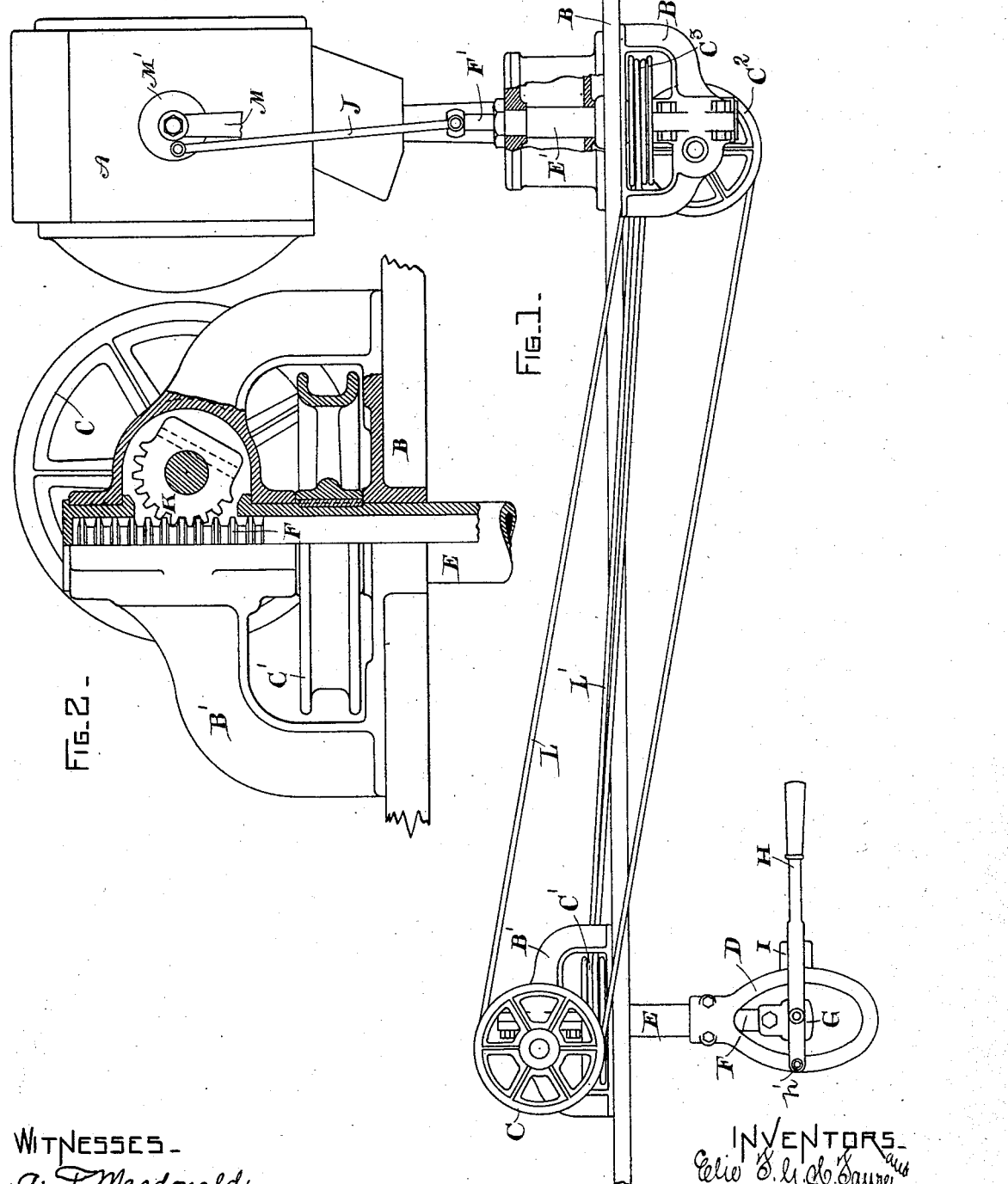

UNITED STATES PATENT OFFICE.

ELIE F. G. H. FAURE AND JOHN MacHAFFIE, OF SCHENECTADY, NEW YORK, ASSIGNORS TO THE GENERAL ELECTRIC COMPANY, OF SAME PLACE.

SEARCH-LIGHT.

SPECIFICATION forming part of Letters Patent No. 539,862, dated May 28, 1895.

Application filed November 17, 1894. Serial No. 529,116. (No model.)

*To all whom it may concern:*

Be it known that we, ELIE F. G. H. FAURE, a citizen of the French Republic, and JOHN MACHAFFIE, a subject of the Queen of Great Britain, residing at Schenectady, county of Schenectady, State of New York, have invented certain new and useful Improvements in Search-Lights, of which the following is a specification.

Our invention relates to search-lights or projectors; and has for its object to provide a means of controlling the motions in altitude and azimuth by means of a single handle, and to effect this operation equally well at a reasonable distance from the operator. To the ends pointed out we arrange a handle pivoted at one end and carrying a vertical rack pivoted at a little distance from the fulcrum so that, by raising or lowering the handle, the rack is raised or lowered. Meshing with the rack is a pinion attached to a band-wheel running to a similar band-wheel upon a corresponding mechanism at the other end of the band, the parts of which are reversed in their operation—that is to say, the rack is operated by the pinion and is connected to the search light by a pitman, thus giving it the necessary elevation or depression. This rack we make of a round rod having teeth cut entirely around it in a plane at right angles to its axis. This construction enables us to rotate the rack without affecting the vertical direction of the light thrown from the projector, and this horizontal rotation we utilize to effect the rotation in azimuth of the projector. A sleeve surrounding the rack is keyed to a horizontal band-wheel from which a belt passes to a second wheel upon a corresponding mechanism at the other end of the band, and this wheel is fast to a sleeve surrounding the corresponding rack so that the rack may pass freely through it vertically, but any horizontal movement is communicated to the sleeve. Where we connect our search light directly to the handle we may dispense with the bands and racks, band-carrying wheels, &c., and in that case we employ only the pivoted handle or lever carrying a vertical reciprocating rod and also connected to means for rotating the projector about its central axis in a horizontal direction.

The accompanying drawings show embodiments of our invention.

Figure 1 is a side elevation of the entire mechanism just described. Fig. 2 is an enlarged detail showing the rack and pinion and band-wheels, being partly in section. Fig. 3 is a side elevation of a modified form applied directly to the search-light, and Fig. 4 is an enlarged sectional detail of the handle.

A is the light or projector which is to be moved.

B is a platform for carrying the entire mechanism. Upon this platform at the left of Fig. 1 is shown mounted a frame B'. The construction of the parts in this frame is best seen in Fig. 2, and in that figure C is the band-wheel the rotation of which is effected by raising and lowering the handle H in Fig. 1.

E is a sleeve in which reciprocates the circular rack F the teeth of which are cut in planes at right angles to its axis and mesh with the pinion K. As shown this pinion embraces only about one-half the circumference, and this is for all practical purposes sufficient, as it is not necessary that the search-light should describe a complete circle in a vertical direction.

C' is the horizontal band-wheel giving the motion in azimuth. This is keyed to the sleeve E which can be rotated freely with the rack F.

Referring again to Fig. 1, bands L, L' pass respectively from the wheels C, C' to the corresponding wheels $C^2$, $C^3$ at the right of the figure. It will readily be seen that any motion of either of the wheels C, C' is communicated by these bands to the wheels $C^2$, $C^3$. The parts at the right of the figure are substantially similar in construction to those shown in Fig. 2, except that they are inverted in position. By this arrangement any motion of the operating handle H is transmitted either to the rack F' upon it or to the sleeve E'. The sleeve E' rotating will of course turn the light horizontally, while the rod F' reciprocating will raise and lower the beam vertically, the pitman J transmitting motion and being attached at a little distance from the center or trunnion M' in the standard M about which the light rotates.

Still referring to Fig. 1, at the left in the figure is shown the arrangement of operating handle which is one of the peculiar features of our invention. Therein D is an open eye or loop of oval form, the sides being approximately circular. This eye is an enlargement of the sleeve E, and forms the means of rotating it. The handle H is pivoted at the point $h'$ and has bearing in it a block G attached to the rack-rod F. It will be seen that by raising and lowering the handle the rack-rod is raised or lowered. The rack on the end of the rod actuates the pinion K and thus the band-wheel C, which in turn actuates the band-wheel $C^2$ and moves the light, as already described; while by rotating the handle H in a horizontal direction the band-wheel C' is operated. The band L' operates the band $C^3$ and thus transmits a corresponding horizontal motion to the light.

The particular form of the handle is best seen in Fig. 4. In that figure $h$ is the handle proper of the lever or handle H. This lever or handle is carried in a sleeve $i$ and has a bearing at $m$ in the block I, which bears against the oval D in Fig. 1. A screw-thread $l$ is provided in the sleeve $i$ and by rotating the handle $h$ the block I is forced against the side of the oval, locking the handle in position.

Referring now to Fig. 3, we illustrate a modification of our invention in which the handle is applied directly to the search light so that the operator may be immediately beneath it, which is sometimes desirable, as where the light is upon the pilot-house of a steamer. In this case the same parts are illustrated except that the sleeve E and the rod F have their bearing in a box-casting O. In Fig. 3 we show also a block N moving in a slot in the part G which forms an attachment between the rod F and the handle H. The operation of the construction shown in this figure is of course identical with that in the others.

The method of operating the light is substantially the same as if the handle by which it is directed were attached directly to the case of the light and held by the operator. We thus get a direct and positive control of the motions of the beam, which is simple and accurate, and dispense with the complications of motors and circuits so often found in other systems of control.

It will be seen that the movement of the operating handle is in the directions in which it is desired to move the beam of light—that is to say, a single operating handle will control the beam of light directly and positively, as a marksman may control a rifle, the horizontal movement of the handle moving the light in azimuth, and its vertical movement moving it in altitude.

The parts are cheap, easy to produce, and easy to repair in case of damage at sea where the greatest usefulness of such lights is found.

What we claim as new, and desire to secure by Letters Patent of the United States, is—

1. The means for controlling search lights herein set out, consisting of an operating handle pivoted at one end, a sleeve having an enlargement at one end to which the handle is pivoted and connected with the search light so as to give a horizontal rotation by the horizontal movement of the handle, a rod actuated by the vertical movement of the handle and carried within the sleeve, the rod connected to the search light eccentrically to its center of rotation and adapted to rotate it in a vertical plane.

2. The means for controlling a search light herein set out, consisting of an operating handle, a sleeve having an enlargement of oval form upon its lower end to one side of which the handle is pivoted, the sleeve connected to the search light in its vertical axis, and a rod passing through the sleeve and connected to the search light eccentrically to its horizontal axis, substantially as described.

3. The means for controlling a search light herein set out, consisting of an operating handle, a sleeve having an enlarged portion in which the operating handle is fulcrumed, a rod passing through the sleeve and raised or lowered by the movement of the operating handle, the sleeve being connected to the search light in its vertical axis and the rod being connected eccentrically to its horizontal axis, and locking means adapted to hold the handle in position.

4. The means for controlling the movement of a search light herein set out, consisting of an operating handle, a sleeve having an enlarged open end in which the handle is fulcrumed, a rod within the sleeve connected with the handle and raised or lowered by its vertical motion, a circular rack upon the end of the rod, a pinion meshing with the rack, a pulley operated by the pinion, a belt, a second pulley at the other end of the belt, a pinion and rack operated by such pulley, a pulley operated by the sleeve, a second belt, another pulley operated by such second belt and operating a corresponding sleeve, the search light being connected to the rod and operated by one of the pulleys and to the sleeve operated by the other, substantially as described.

5. In a controlling stand for search lights, an operating handle, a sleeve having an enlarged open end in which the handle is fulcrumed, a rod attached to the handle and reciprocating vertically in the sleeve, locking means for the handle, a rack upon the end of the rod, pulleys operated by the rack and by the horizontal rotation of the sleeve, bands connecting such pulleys with similar pulleys upon another stand, a similar sleeve actuated by one of such pulleys, and a rack-rod actuated by the pinion attached to the other pulley, the sleeve and rack-rod being attached to the search light respectively in its vertical axis of rotation and eccentrically to its horizontal axis, substantially as described.

In witness whereof we have hereunto set our hands this 16th day of November, 1894.

ELIE F. G. H. FAURE.
    JOHN MACHAFFIE.

Witnesses:
 B. B. HULL,
 A. F. MACDONALD.